3,318,980
NOVEL TRI-VALENT PHOSPHORUS DERIVATIVES
Joseph M. Sandri, Chicago Heights, Ill., assignor to Standard Oil Company, Chicago, Ill., a corporation of Indiana
No Drawing. Filed Dec. 27, 1963, Ser. No. 334,039
4 Claims. (Cl. 260—956)

This invention relates to certain novel trivalent phosphorus derivatives of hexachloronorbornenyl-methanol, and particularly to lubricant compositions containing such derivatives.

The development of the automobile transaxle by the automotive industry has introduced special problems into automotive lubrication. The transaxle is a unit which combines the transmission and rear axle hypoid gear mechanisms in a single housing. The transmission unit can be either of the manual shift, or hydraulically controlled automatic types. It is desirable for engineering and economic reasons to combine the transmission and rear axle units in such a manner that the same lubricant can be used for both of these mechanisms. However, there are substantial differences in the lubricant requirements between manually shifted and hydraulically controlled automatic transaxle types.

The conventional automobile automatic transmission are hydraulic torque transmitting devices which require substantially different lubricants from those used in conventional automobile manual transmissions and differentials. The automatic transmission requires a fluid lubricant which is of relatively low viscosity that does not vary considerably over a wide temperature range and which is stable at relatively high temperatures. The hypoid gears of the differential have heretofore required extreme pressure additives in a fairly high viscosity lubricant. While conventional hypoid gear lubricants can be used as the single lubricant for manual shift transaxles, the automatic type transaxles require a lubricant that has all of the characteristics of an automatic transmission fluid plus the extreme pressure characteristics essential to satisfactory operation of hypoid gears. The present invention is therefore directed to the provision of means for producing an automatic transaxle fluid that will function as a single lubricant for the automatic transmission and hypoid gear units in the transaxle.

The essential problem in the development of a transaxle fluid is therefore the production of the desired extreme pressure characteristics in an automatic transmission fluid without impairing the characteristics and function of the automatic transmission fluid. Adding a conventional extreme pressure agent to an automatic transmission fluid does not solve the problem because conventional extreme pressure agents are usually corrosive and can also act as pro-oxidants. Furthermore, conventional extreme pressure agents generally are incompatible with automatic transmission fluids, clutch plates and seals. A satisfactory extreme pressure agent must have superior extreme pressure properties, be oxidation stable, thermally stable, non-corrosive, and non-reactive and compatible with automatic transmission fluids, seals, and clutch plates. The reader is referred to Hunstad et al. paper (and the literature cited) on "Developing Transaxle Fluid," presented at the January 1960 annual meeting of the Society of Automotive Engineers, and published in SAE Transactions, vol 68, 1960, pp. 685–698, for more detailed information with respect to lubricants for hypoid gears, automatic transmissions, and transaxle.

A new class of compounds, hereinafter described, has been discovered which when added to automatic transmission fluids in small amounts produce lubricating fluids suitable for service as a single lubricant in automatic type transaxles. These new compounds can be classified as extreme pressure agents that are soluble in and compatible with automatic transmission fluids, non-reactive, and have the ability to impart the requisite extreme pressure property to such fluids.

The new class of extreme pressure agents which have been found to possess the desired qualities described above are certain trivalent phosphorus compounds having the formula:

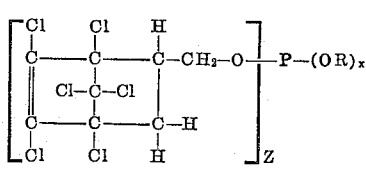

wherein R is $C_{1-18}$ alkyl, $x$ is 0–1 and $z$ is 2–3.

The herein described derivatives can be employed in amounts of from about 0.1 to about 10%, preferably 3 to 6%, by weight, in automatic transmission fluids to form transaxle fluids suitable for use as the single lubricant for automatic transaxle units. The term "transaxle fluid" as used in the description and claims refers to lubricating fluids consisting essentially of an automatic transmission fluid and the new compounds of the present invention.

Automatic transmission fluids are well known in the art. Generally, they are petroleum base oils having a viscosity in the range of 35–100 SUS at 100° F. compounded with additives to provide the proper antioxidation, detergent, viscosity stability, viscosity index, pourpoint, clutch plate and seal compatibility, anti-rust, anti-squawk, anti-chatter, and anti-foam properties.

An automatic transmission fluid consisting essentially of:

(1) about 72.1 weight percent of a petroleum base oil having a viscosity in the range of 35–100 SUS at 100° F.;
(2) about 3 weight percent of a polymethacrylate having an average viscosity of about 3700 SUS at 210° F.;
(3) about 17 weight percent of a polybutene having a mean molecular weight of about 1800 and an average viscosity of 15,000 SUS at 210° F.;
(4) about 6.8 weight percent of the oil soluble reaction product prepared by the process comprising the steps of
  (a) reacting a butene polymer having an average molecular weight of 800 with about 15.5 weight percent of $P_2S_5$ at a temperature of about 450° F. for about 5.5 hours,
  (b) mixing the resultant reaction product with about 0.1 mole of polymeric linoleic acid having an average molecular weight of about 775, about 1.4 moles of boric acid, about 17.1 moles of methanol and about 1.6 moles of water and heating the resultant mixture at reflux temperature for about one hour,
  (c) adding to said mixture about 0.7 mole of zinc oxide and continuing heating the mixture at reflux temperature for about two hours,
  (d) adding to the partially neutralized reaction product thus obtained about 1.3 moles of barium oxide and continuing heating of the resultant mixture at reflux temperatures for about two hours, and
  (e) then heating the resultant mixture to about 350° F. to remove said water and methanol therefrom;
(5) about 0.1 weight percent of calcium sulfonate;
(6) about 0.5 weight percent of tertiary-$C_{12-18}$ alkyl primary amine; and (7) about 0.5 weight percent of 2,6-di-t-butyl-4-methylphenol.

was prepared to demonstrate the present invention. This fluid will be referred to in the examples following as ATF lubricant.

In the following examples illustrating the present invention, the extreme pressure properties of the transaxle fluid was determined by the SAE Extreme Pressure Method at 14 to 1 gear ratio, 100 r.p.m. with automatic loading. Oxidation stability of the transaxle fluids was determined by the Oven Oxidation Stability Test. In this test, 200 g. of the fluid is placed in a 400 ml. Griffith beaker. Ten-inch lengths of 18-gauge copper wire and 20-gauge iron wire, each carefully polished with emery cloth and wound into approximately one-half inch diameter coils are placed in the fluid. The beaker is covered with a watch glass and stored in a thermostatically controlled oven at 275° F. for 100 hours. The sample is then removed and filtered through fluted filter paper. Visual examination is made for sludge formation, and condition of the copper and iron wires and filter paper. Any sludge formation or excessive corrosion of the wires constitutes a fail.

*Example 1*

To a solution of 662 g. (2 mol) hexachloronorbornenyl-methanol (allyl alcohol adduct of hexachlorocyclopentadiene) and 17.0 ml. pyridine in 1.5 liters toluene there was slowly added added 60 ml. (92 g., 0.67 mol) $PCl_3$ while the temperature of the mixture was kept at about 20° C. by external cooling. After all of the $PCl_3$ was added, the mixture was stirred for 18 hours at 60° C. Then the mixture was refluxed for one hour and the pyridine hydrochloride was removed by filtration. The filtrate was evaporated in vacuo. The residue was taken up in a solution of one liter hexane and 500 ml. benzene and filtered. The filtrate was evaporated in vacuo giving 676 g. of dark viscous product of structure

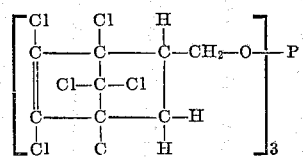

*Analysis.*—Calculated for $C_{24}H_{15}Cl_{18}PO_3$: Cl, 62.5; P, 3.07. Found: Cl, 60.1; P, 3.11.

A transaxle fluid consisting of a 6 weight percent solution of the phosphorus derivative of this example in the ATF lubricant passed the oven oxidation stability test. In the SAE E.P. test, the transaxle fluid carried 315 pounds, whereas the ATF lubricant without the additive failed at 90 pounds.

*Example 2*

A solution of 1106 g. (7 mol) Oxodecyl alcohol in one liter toluene was slowly added to 620 ml. (962 g., 7 mol) $PCl_3$ while the temperature of the reaction mixture was maintained below 30° C. by external cooling with continuous removal of HCl formed. After all of the decyl alcohol had been added, the mixture was slowly heated to 100° C. and kept there for one hour to remove residual HCl, and then allowed to cool to room temperature. The cool solution of $C_{10}H_{21}OPCl_2$ was then slowly added to a solution of 4634 g. (14 mol) of hexachloronorbornenyl-methanol (allyl alcohol adduct of hexachlorocyclopentadiene) in 3.5 liters toluene while the temperature was maintained below 30° C. by external cooling. After all the $C_{10}H_{21}OPCl_2$ had been added, the resultant mixture was heated at 70° C. for 18 hours, with continuous removal of the decyl alcohol by-product formed, and then refluxed at 90° C. for three hours. The solution was then evaporated in vacuo giving 5415 g. of dark viscous liquid phosphite having the structure

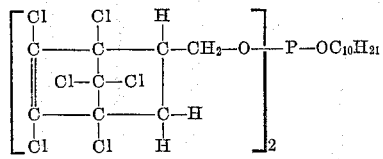

*Analysis.*—Calculated for $C_{26}H_{31}Cl_{12}PO_3$: Cl, 50.22; P, 3.66. Found: Cl, 52.4; P, 3.89.

Transaxle fluids consisting of solutions of the ATF lubricant and 4 and 6 weight percent of the phosphite of this example passed the oven oxidation stablity test. In the SAE E.P. Test, the transaxle fluid containing 6% phosphite passed at 445 pounds whereas the ATF lubricant failed at 90 pounds.

Three transaxle fluids containing 3, 4, and 6% phosphite were evaluated in passenger cars equipped with automatic type transaxles. These fluids passed the full scale passenger car road tests used to measure differential hypoid-gear tooth distress which test was the well known High Speed Tempest differential gear test developed by General Motors. The transaxle fluids containing 4 to 6% phosphite also passed the CRC L–39 test for determining the oxidation resistance and thermal stability of power transmission fluids.

*Example 3*

A mixture of 496.5 g. (1.5 mol) hexachloronorbornenylmethanol and 127.7 g. (0.75 mol) triethylphosphite was heated to 130° C. whereupon ethanol started to evolve. The mixture was then slowly heated to 180° C. to remove all of the ethanol by-product liberated in the reaction. There was recovered 532 g. of liquid phosphite product having the structure

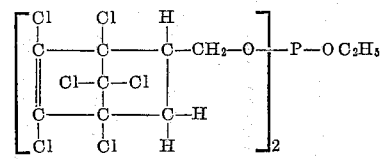

*Analysis.*—Calculated for $C_{18}H_{15}Cl_{12}PO_3$: Cl, 57.4; P, 4.21. Found: Cl, 55.1; P, 3.72.

A 6% solution of this phosphite in the ATF lubricant formed a transaxle fluid that passed the oven oxidation stability test and passed 320 pounds in the SAE E.P. Test.

The above example demonstrate that the new class of phosphorus derivatives described herein are effective extreme pressure agents. Further, that transaxle fluids suitable for use as a single lubricant in automatic type transaxle units can be simply produced by the simple addition of a member of the new class of compounds of the invention to an automatic transmission fluid.

Unless otherwise stated, percentages given herein and the claims are weight percentages.

Thus having described the invention, the invention claimed is:

1. A trivalent phosphorus compound having the formula:

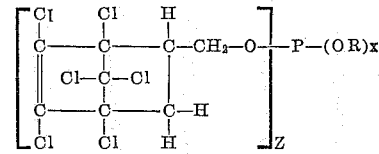

wherein R is $C_{1-18}$ alkyl, $x$ is 0–1, and $z$ is 2–3.

2. The trivalent phosphorus compound having the formula:

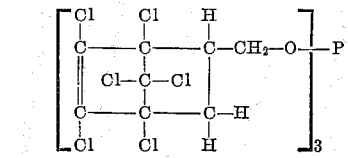

3. The trivalent phosphorus compound having the formula:
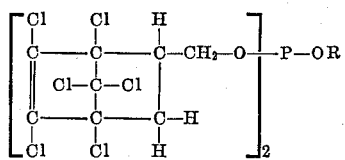
wherein R is $C_{1-18}$ alkyl.
4. The trivalent phosphorus compounds having the formula:
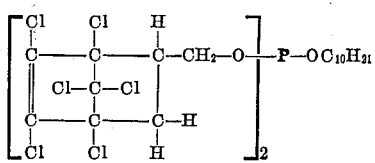
No references cited.
CHARLES B. PARKER, *Primary Examiner.*
RICHARD L. RAYMOND, *Assistant Examiner.*

UNITED STATES PATENT OFFICE
CERTIFICATE OF CORRECTION

Patent No. 3,318,980

May 9, 1967

Joseph M. Sandri

It is hereby certified that error appears in the above numbered patent requiring correction and that the said Letters Patent should read as corrected below.

Column 3, line 28, strike out "added", second occurrence; lines 40 to 44, the formula should appear as shown below instead of as in the patent:

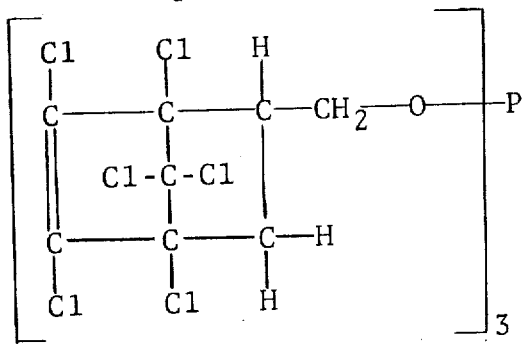

Signed and sealed this 28th day of November 1967.

(SEAL)
Attest:

EDWARD M. FLETCHER, JR.
Attesting Officer

EDWARD J. BRENNER
Commissioner of Patents